United States Patent
Grandchamp et al.

(10) Patent No.: US 6,710,813 B1
(45) Date of Patent: Mar. 23, 2004

(54) MULTIPLEXER FOR ADJACENT NTSC AND DTV CHANNELS

(75) Inventors: Brett J. Grandchamp, Cumberland, ME (US); William A. DeCormier, Poland, ME (US)

(73) Assignee: SPX Corporation, Charlotte, NC (US)

( * ) Notice: Subject to any disclaimer, the term of this patent is extended or adjusted under 35 U.S.C. 154(b) by 499 days.

(21) Appl. No.: 09/660,683

(22) Filed: Sep. 13, 2000

(51) Int. Cl.[7] ................................................ H04N 7/12
(52) U.S. Cl. ........................ 348/487; 348/723; 348/484; 333/126
(58) Field of Search ................................. 348/723, 487, 348/484, 21, 470; 333/126; 455/129, 103, 108, 91; 343/768, 720

(56) References Cited

U.S. PATENT DOCUMENTS

| | | | |
|---|---|---|---|
| 4,029,902 A | 6/1977 | Bell, Jr. et al. .......... 179/15 FD |
| 4,792,805 A | 12/1988 | Miglia ......................... 342/372 |
| 4,815,075 A | 3/1989 | Cameron ..................... 370/123 |
| 4,847,574 A | 7/1989 | Gauthier et al. ............. 33/21 A |
| 5,163,181 A | 11/1992 | Koontz ........................ 455/103 |
| 5,412,426 A * | 5/1995 | Totty ........................... 348/385 |
| 5,450,392 A * | 9/1995 | Waltrich ........................ 370/6 |
| 5,497,166 A * | 3/1996 | Mahnad ....................... 343/795 |
| 5,604,747 A | 2/1997 | Callas ......................... 370/297 |
| 5,663,683 A | 9/1997 | McCandless ................. 330/286 |
| 5,736,907 A | 4/1998 | Chen et al. ................... 333/113 |
| 5,774,193 A * | 6/1998 | Vaughan ...................... 348/723 |
| 5,929,821 A * | 7/1999 | Goldstein et al. ............. 343/770 |
| 6,278,498 B1 * | 8/2001 | Neff ............................ 348/723 |

* cited by examiner

Primary Examiner—Victor R. Kostak
(74) Attorney, Agent, or Firm—Baker & Hostetler LLP

(57) ABSTRACT

A signal mutiplexer that combines the NTSC and DTV signals of adjacent television channels into a composite signal for transmission on a common transmission line or wave guide. Separate hybrid couplers and band pass filters produce quadrature phase signals that are combined in a signal combiner to produce a pair of quadrature phase multiplexed signals. A notch filter reflects the aural component of the NTSC signal. An output hybrid coupler combines the pair of multiplexed quadrature phase signals with the reflected aural component to produce the composite signal.

11 Claims, 4 Drawing Sheets

US 6,710,813 B1

MULTIPLEXER FOR ADJACENT NTSC AND DTV CHANNELS

BACKGROUND OF THE INVENTION

1. Field of the Invention

This invention relates to an apparatus and a method for multiplexing signals of different frequency bands, and, in particular, to a low cost signal multiplexer and method that combines a national standard television code ("NTSC") signal with a digital television ("DTV") signal.

2. Description of the Prior Art

The introduction of digital television service has resulted in a need for a station to broadcast the television picture in the NTSC format for reception by television sets that are not equipped for digital reception and in DTV format for reception by television sets that are equipped for digital reception. These stations have been allocated the next higher channel for DTV service. That is, the NTSC signal is broadcast on channel N and the DTV signal is broadcast on channel N+1, channels N and N+1 being adjacent channels. There is a need for these stations to combine the NTSC and DTV signals into a composite signal for transmission on a common transmission line and antenna.

Prior art multiplexers include a branch combiner, a star combiner and a manifold combiner. These signal combiners have a serious disadvantage in that they do not present a constant impedance to the inputs that receive the signals. That is, out of band energy is reflected back to the inputs.

Another prior art multiplexer presents a constant impedance to the input. An example of this style of multiplexer is shown in U.S. Pat. No. 4,029,902. As shown in this patent, this style of multiplexer typically has a pair of matched filters, two hybrids and a load for each signal channel. The filtered output of each channel is fed as an input to the next channel and so on. Although reflected energy to the channel inputs is nil, the cost is high because 2N hybrids are required, where N is the number of signals or channels to be multiplexed. Moreover, the bandwidth is limited to the short circuit VSWR (voltage standing wave ratio) of the output hybrid. The short circuit VSWR is dependent on the amplitude balance of the output hybrid of each channel. In coax hybrids, the amplitude balance is controlled in the design of the hybrid by the use of multiple quarter wave coupled sections, which are power limited. In wave guide hybrids, which can take more power, the amplitude balance is limited by the inability to produce multiple quarter wave coupled sections. Consequently, when the bandwidth causes the amplitude ripple to exceed 0.085 dB, the short circuit VSWR exceeds 1.04:1. The sum of the VSWR of the individual channels quickly accumulates until the system exceeds a VSWR of 1.10:1 that is required by the transmitters.

There is a need for a signal multiplexer that is capable of combining an NTSC signal with a DTV signal for transmission on a common transmission line and antenna that is not bandwidth limited by the quality or power capacity of components, such as hybrid couplers.

SUMMARY OF THE INVENTION

A multiplexer according to the invention includes a first hybrid coupler and a first pair of band pass. filters to convert the NTSC signal into a first pair of filtered quadrature phase signals. A second hybrid coupler and a second pair of band pass filter converts the DTV signal into a second pair of filtered quadrature phase signals. A signal combiner combines the first and second pairs of filtered quadrature phase signals to produce a pair of multiplexed quadrature phase signals. A notch filter is connected to the signal combiner and is tuned to the aural frequency band of NTSC signal. A third hybrid coupler converts the pair of multiplexed quadrature phase signals into a single multiplexed signal.

A video component of the NTSC signal is converted by the first hybrid coupler to produce the first pair of quadrature phase signals. The third hybrid coupler converts an aural component of the NTSC signal into a pair of aural quadrature phase signals that are reflected by the signal combiner. The third hybrid coupler combines the reflected pair of aural quadrature phase signals and the pair of multiplexed quadrature phase signals into the single multiplexed signal.

BRIEF DESCRIPTION OF THE DRAWING

Other and further objects, advantages and features of the present invention will be understood by reference to the following specification in conjunction with the accompanying drawings, in which like reference characters denote like elements of structure and.

DESCRIPTION OF THE INVENTION

Figure 1:
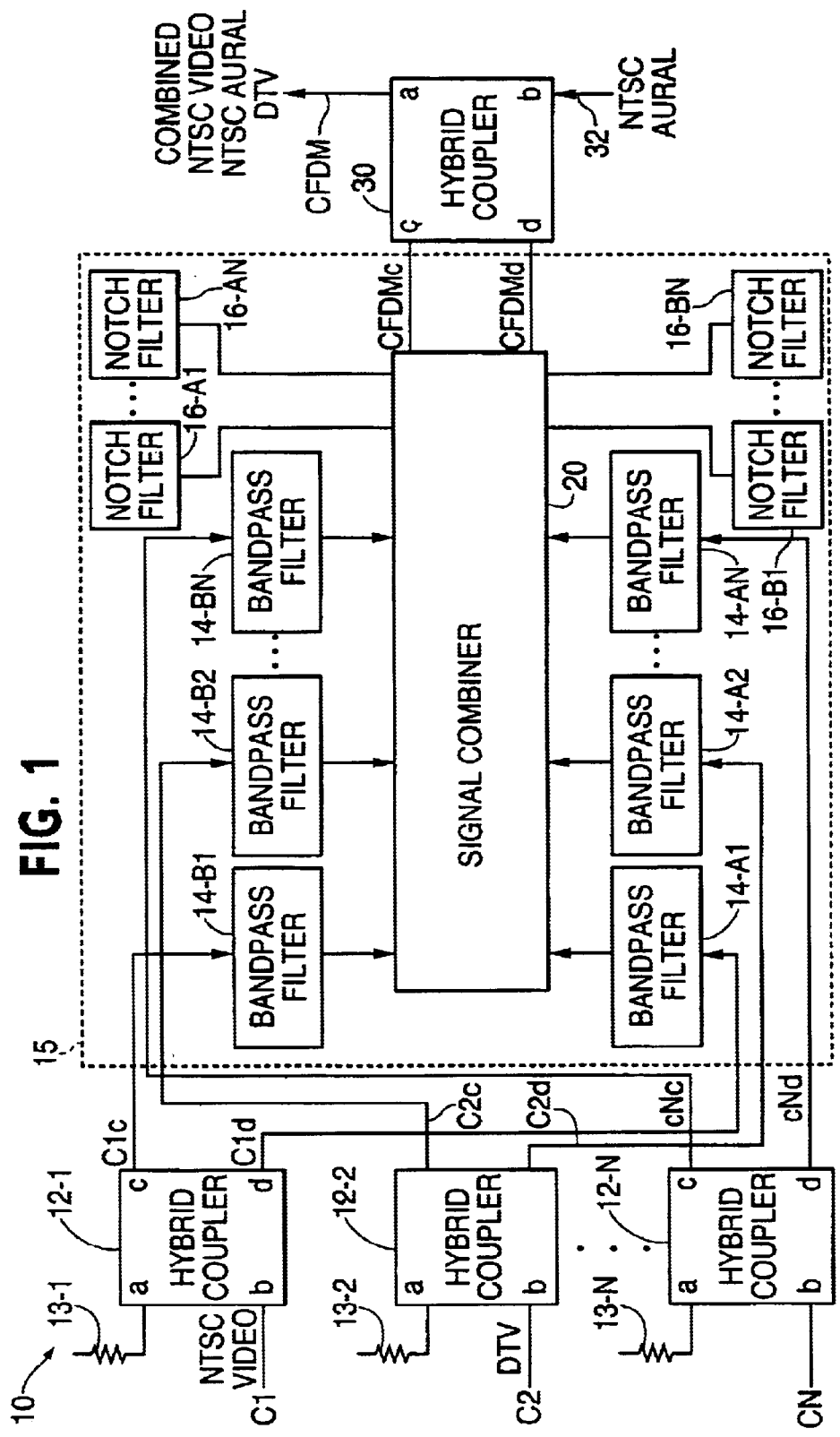
FIG. 1 is a schematic block diagram of a multiplexer according to the present invention.

Referring to FIG. 1, there is shown a multiplexer 10 according to the present invention. Multiplexer 10 includes N input hybrid couplers 12-1 and 12-2 through 12-N, where N is two or more, a filtering and combining system 15 and an output coupler 30 for a total of N+1 hybrid couplers. Hybrid couplers 12-1, 12-2 and 12-N receive input signals C1, C2 and CN, respectively. Signals C1, C2 and CN each have frequencies in a different frequency band or channel (channels 1 through N, respectively) and constitute the signals to be multiplexed by multiplexer 10 to a frequency division multiplexed output signal CFDM at output hybrid coupler 30.

According to the present invention, the signals of adjacent frequency channels are the NTSC and DTV versions of the same image or picture. For example, channels 1 and 2 may be channels 30 and 31 with their signals C1 and C2 being in NTSC and DTV format, respectively.

Hybrid couplers 12-1 through 12-N and 30 are substantially identical and have ports a, b, c, and d. Ports b of input hybrid couplers 12-1, 12-2 and 12-N are connected to receive input signals C1, C2 and CN, respectively. Ports a of input hybrid couplers 12-1, 12-2 and 12-N are connected to a load 13-1, a load 13-2 and a load 13-N, respectively. Input hybrid coupler 12-1 develops one half amplitude quadrature phase signals C1c and C1d at its ports c and d, respectively. Input hybrid coupler 12-2 develops one half amplitude quadrature phase signals C2c and C2d at its ports c and d, respectively. Input hybrid coupler 12-N develops one half amplitude quadrature phase signals CNc and CNd at its ports c and d, respectively.

Signal filtering and combining system 15 includes a first plurality of band pass filters 14-B1 and 14-B2 through 14-BN and a second plurality of band pass filters 14-A1 and 14-A2 through 14-AN. Filters 14-A1 and 14-B1 form a matched pair in that they both have the same pass band filter characteristic that matches the frequency band of input signal C1. Similarly, filters 14-A2 and 14-B2 form a matched pair and filters 14-AN and 14-BN form a matched pair with pass band characteristics that match the frequency bands of signals C1 and CN, respectively.

Quadrature phase signal pair C1c and C1d are applied to matched filter pair 14-B1 and 14-A1, respectively. Quadrature phase signal pair C2c and C2d are applied to matched filter pair 14-B2 and 14-A2, respectively. Quadrature phase signal pair CNc and CNd are applied to matched filter pair 14-BN and 14-AN, respectively.

Signal filtering and combining system 15 also includes a signal combiner 20 that combines the filtered quadrature phase signals C1c, C2c, CNc, C1d, C2d and CNd to produce a quadrature phase signal pair CFDMc and CFDMd. Quadrature phase signal pair CFDMc and CFDMd constitute a frequency division multiplexed signal pair for input signals C1 through CN. Quadrature phase signals CFDMc and CFDMd are applied to ports c and d of output hybrid coupler 30. Output hybrid coupler 30 converts quadrature phase signals CFDMc and CFDMd to a single frequency division multiplexed signal CFDM at its output port a.

Any out of band energy rejected by filters 14-A1 through 14-AN and 14-B1 through 146-BN is reflected back to input hybrid couplers 12-1 through 12-N and absorbed in loads 13-1 through 13-N. For example, out of band energy reflected by matched filter pair 14-1 and 16-1 is absorbed in load 13-1. Thus, multiplexer 10 presents a constant impedance to the transmitters that provide signals C1 through CN.

In the embodiment of FIG. 1, the video portion of the NTSC signal C1 is applied to port a of input hybrid coupler 12-1. The aural portion of the NTSC signal is applied to port b of output hybrid coupler 30.

Signal filtering and combining system 15 also includes a notched filter pair for each pair of adjacent frequency channels. Thus, a matched pair of notch filters 16-A1 and 16-B1 are provided for the adjacent frequency channels 1 and 2 (signals C1 and C2) that correspond to channels 30 and 31 of the aforementioned example. A matched pair of notch filters 16-AN and 16-BN are provided for the adjacent frequency channels N and N−1. The signal and input hybrid coupler for channel N−1 are not shown on the drawing, but are indicated by the dashed line between input couplers 12-2 and 12-N.

Notch filters 16-A1 and 16-B1 are each tuned to reject the aural signal portion of NTSC signal C1. Also, notch filters 16-AN and 16-BN are each tuned to reject the aural signal portion of the NTSC signal for channels N−1 and N. Thus, the aural signals applied to port b of output hybrid coupler are reflected by notch filters 16-A1, 16-B1, 16-AN and 16-BN and recombined in output hybrid coupler 30. Thus, output signal CFDM is a composite signal that includes the DTV and the NTSC video and aural signal components.

Signal combiner 20 may be any suitable signal combiner that combines signals of different frequency bands into a frequency division multiplexed signal. For example, signal combiner 20 may be implemented in a manifold style combiner or a star point style combiner.

Figure 2:
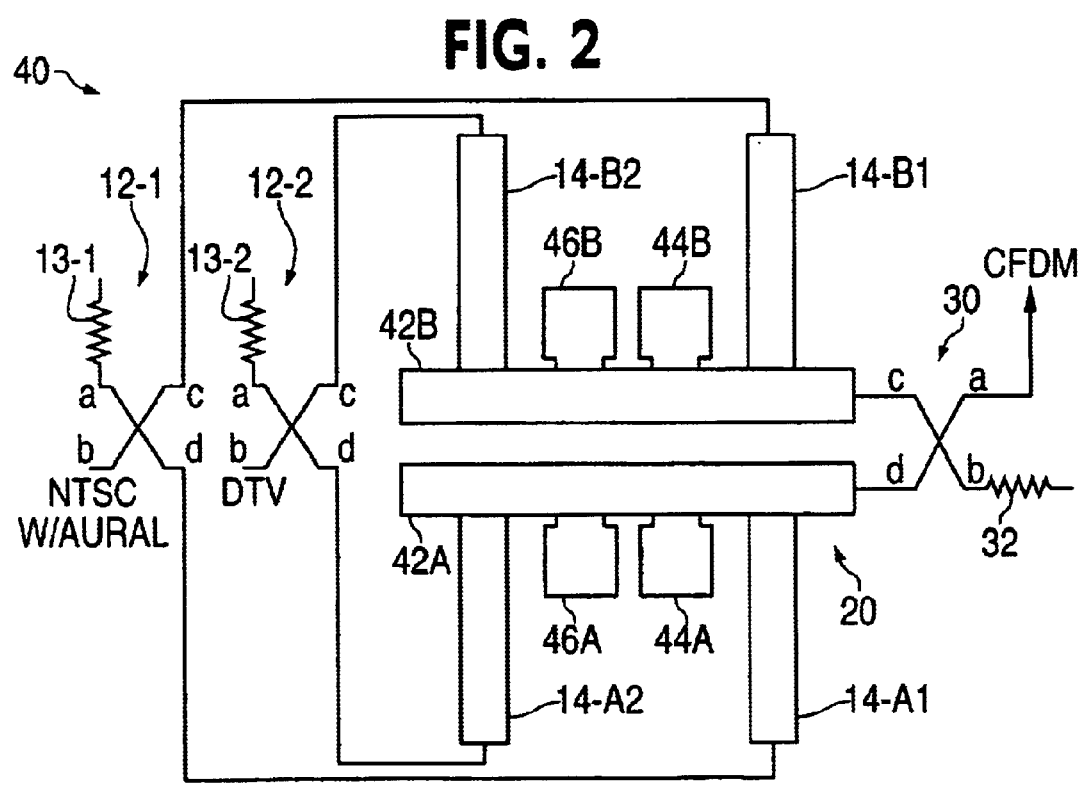
FIG. 2 is a schematic block diagram of an alternate embodiment of the multiplexer according to the present invention.

Referring to FIG. 2, an alternate embodiment of the present invention is provided as a multiplexer 40 which includes many of the same components of multiplexer 10 that bear the same reference numerals. Multiplexer 40 differs from multiplexer 10 as follows. The NTSC signal, both video and aural, is applied to the b port of input hybrid 12-1 and the b port of output hybrid 30 is connected to a load 32.

Signal combiner 20 is shown as a pair of manifolds 42A and 42B. Bandpass filters 14-A1 and 14-B1 are connected to manifolds 40A and 40B near their respective right ends. Bandpass filters 14-A2 and 14-B2 are connected to manifolds 40A and 40B near their respective left ends. A pair of notch filters 44A and 46A is connected to manifold 40A intermediate bandpass filters 14-A1 and 14-A2. A pair of notch filters 44B and 46B is connected to manifold 40B intermediate bandpass filters 14-B1 and 14-B2.

The aural frequency is hear the bandwidth of the DTV signal as passed by bandpass filters 14-A2 and 14-B2. Notch filters 44A and 46A and 44B and 46B reflect the aural frequency and isolate it from the DTV signal. Notch filters 44A and 44B are tuned to the carrier or center frequency of the aural signal. Notch filters 46A and 46B are tuned to a frequency that is in the range of about one to about 200 kilocycles above or below the aural carrier frequency and serve to widen the bandwidth of aural signal reflection. The dual notch filters 44A and 46A and 44B and 46B also serve to control group delay of the reflection of the aural signal. Notch filters 44A, 44B, 46A and 46B are generally implemented with wave guides, but may also be implemented with coaxial structures.

Figure 3:
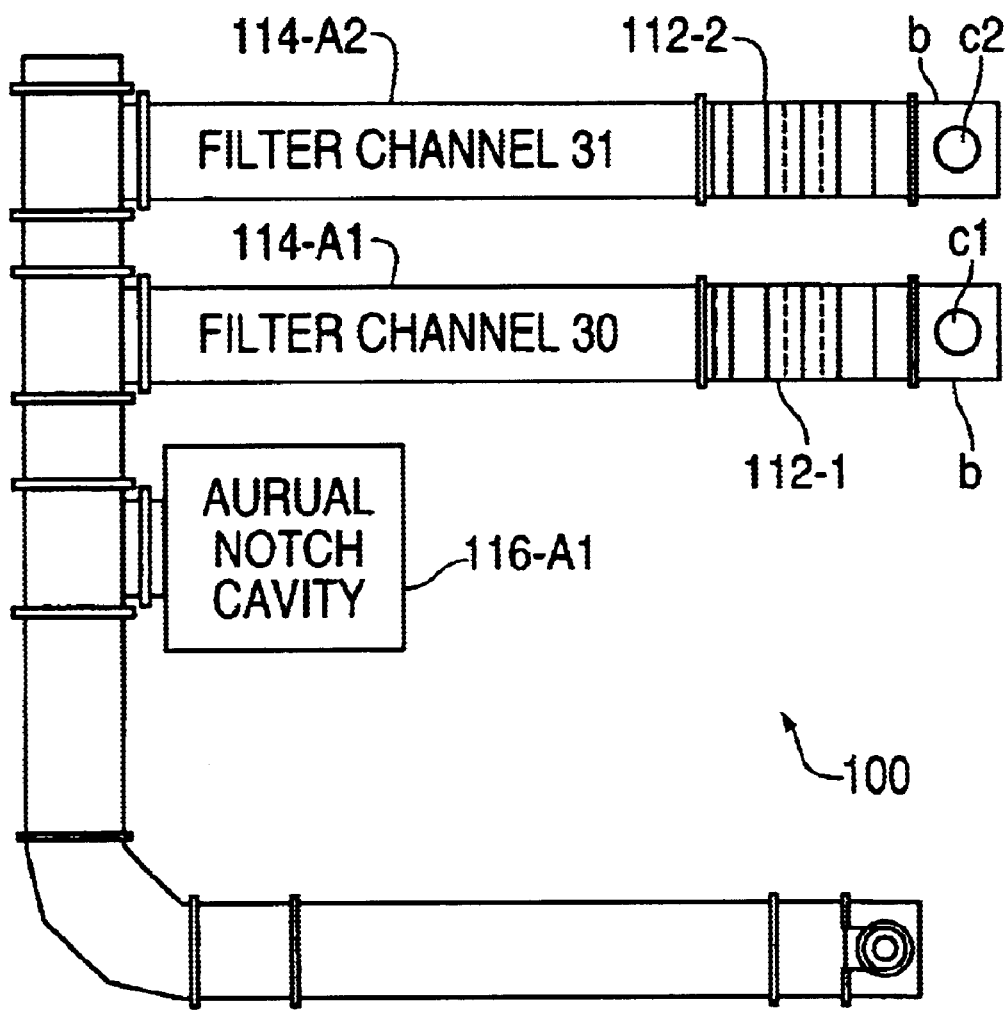
FIG. 3 is a top view of a manifold style multiplexer for the FIG. 1 multiplexer.
Figure 4:
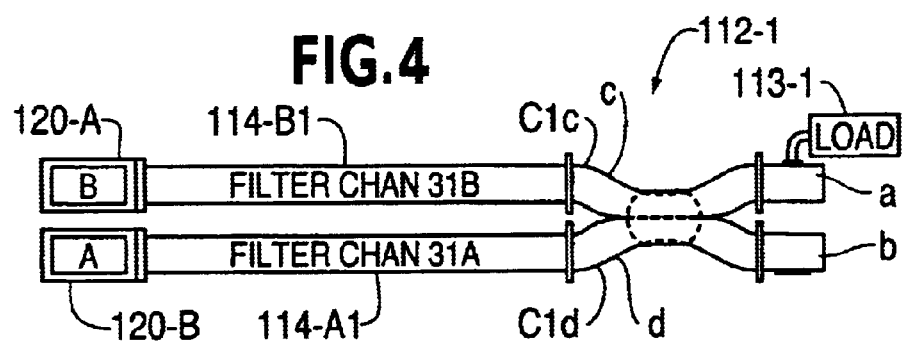
FIG. 4 is an elevation view of the upper end of FIG. 3.

Referring to FIGS. 3 through 6, the FIG. 1 multiplexer 10 is shown in a manifold style multiplexer 100 that is configured to multiplex adjacent channel signals C1 and C2. Again, the aforementioned example of channels C1 and C2 corresponding to channels 30 and 31 is used. Manifold style multiplexer 100 has input hybrid couplers 112-1 and 112-2 for receiving channel signals C1 and C2 at their respective ports b. Ports a of each input hybrid coupler 112-1 and 112-2 are coupled to separate dummy loads such as load 113-1 shown in FIG. 4 for input hybrid coupler 112-1. Ports c of input hybrid couplers 112-1 and 112-2 are connected to band pass filters 114-A1 and 114-A2 as shown in FIG. 4 for input hybrid coupler 112-1. Input hybrid couplers 112-1 and 112-2 have their ports d connected to separate ones of band pass filters 114-B1 and 114-B2, as shown in FIG. 4 for hybrid coupler 112-1.

Band pass filters 114-B1 and 114-B2 have their outputs connected to a manifold 120A for combining the filtered quadrature phase signals, such as signal C1c for band pass filter 114-B1 shown in FIG. 3. Band pass filters 114-A1 and 114-A2 have their outputs connected to a manifold 120B for combining the filtered quadrature phase signals, such as signal C1d for pass band filter 114-A1 shown in FIG. 4. Manifolds 120A and 120B produce at their respective outputs the quadrature phase signals CFDMc and CFDMd shown in FIG. 6. Manifolds 120A and 120B correspond to and perform the signal combining function as signal combiner 20 of FIG. 1.

Figure 5:
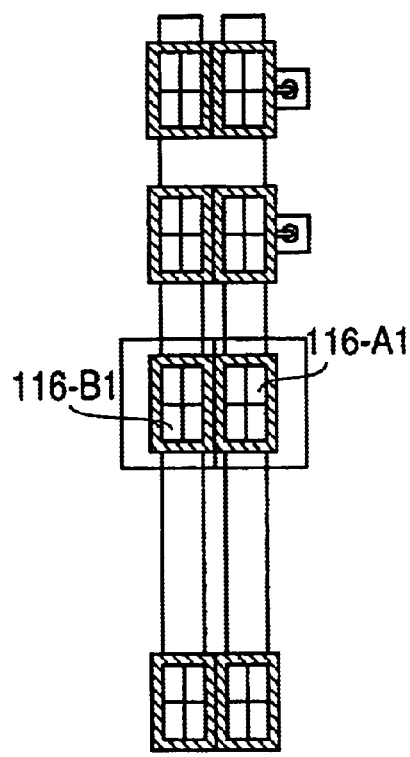
FIG. 5 is a side view of FIG. 3.

A pair of notch filters 116-A1 and 116-B1 are mounted in stacked relationship and connected to manifolds 120A and 120B, respectively, as shown in FIGS. 3 and 5. Notch filters 116-A1 and 116-B1 are generally implemented with wave guides, but may be implemented with coaxial structures.

Figure 6:
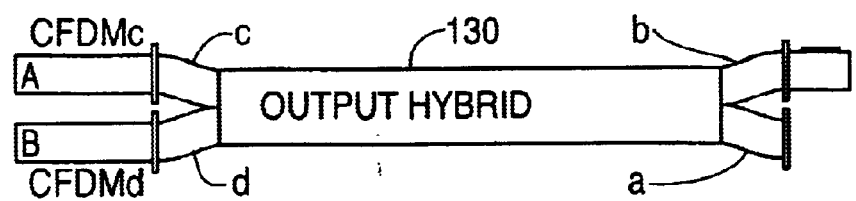
FIG. 6 is an elevation view of the lower end of FIG. 3.

Referring to FIG. 6, quadrature phase signals CFDMc and CFDMd are applied to ports a and b of an output hybrid 130, respectively. Port b of output hybrid 130 is connected to receive the aural component of the NTSC signal for channel 30 or C1. Multiplexed signal CFDM is developed at port a of hybrid output coupler 130 for application to a television broadcast antenna (not shown).

Manifold style multiplexer 100 is shown as using wave guide components for input hybrid couplers 112, band pass filters 114, manifolds 120A and 120B and output hybrid coupler 130. It will be appreciated by those skilled in the art that manifold style multiplexer 100 may be implemented with any combination of wave guide and coax components.

Band pass filters 114-A1 and 114-A2 are located above band pass filters 114-B1 and 114-B2 in a stacked relationship. Manifolds 120A and 120B are positioned in a stacked relationship substantially perpendicular to and are connected to the stack of filters 114. Output hybrid coupler 130 is positioned substantially parallel to the stack of filters 114 and is connected to the stacked manifolds 120A and 120B.

The present invention having been thus described with particular reference to the preferred forms thereof, it will be obvious that various changes and modifications may be made therein without departing from the spirit and scope of the present invention as defined in the appended claims.

What is claimed is:

1. A signal multiplexer for multiplexing a DTV signal and an NTSC signal that have different frequency bands, said signal multiplexer comprising:
    a first hybrid coupler and a first band pass filter that converts said NTSC signal into a first pair of filtered quadrature phase signals, wherein a video component of said NTSC signal is converted by said first hybrid coupler to produce said first pair of quadrature phase signals;
    a second hybrid coupler and a second band pass filter that converts said DTV signal into a second pair of filtered quadrature phase signals wherein said first and second band pass filters includes a pair of matched band pass filters, one for the quadrature phase signal of the first phase and the other for the quadrature phase signal of the second phase;
    a signal combiner that combines said first and second pairs of filtered quadrature phase signals to produce a pair of multiplexed quadrature phase signals;
    a notch filter that connected to said signal combiner and that is tuned to the aural frequency band of said NTSC signal; and
    a third hybrid coupler that converts said pair of multiplexed quadrature phase signals into a single multiplexed signal wherein said third hybrid coupler combines said reflected pair of aural quadrature phase signals and said pair of multiplexed quadrature phase signals into said single multiplexed signal;
    wherein said first hybrid coupler has a second port connected with a first load and third and fourth ports connected with separate ones of said first pair of matched band pass filters, wherein said second hybrid coupler has a second port connected with a second load and third and fourth ports connected with separate ones of said second pair of matched band pass filters, whereby out of band energy reflected from said first and second pairs of matched band pass filters is steered to said first and second loads.

2. The signal multiplexer of claim 1, wherein said signal combiner includes a first signal combiner that combines all of the filtered quadrature phase signals of the first phase and a second signal combiner that combines all of the filtered quadrature phase signals of the second phase.

3. The signal multiplexer of claim 2, wherein said first and second signal combiners are first and second manifolds, respectively.

4. The signal multiplexer of claim 3, wherein said first and second manifolds are wave guides that are spatially positioned in a stacked relationship;
    wherein each of the filters of said first and second pairs of matched filters are wave guides that are spatially positioned in a stacked relationship abutting and connected with said first and second manifolds;
    wherein said first and second hybrid couplers are wave guides that are positioned so as to abut and connect to separate ones of said first and second pairs of matched filters; and
    wherein said third hybrid coupler is a wave guide that is positioned to abut and connect to said first and second manifolds.

5. The signal multiplexer of claim 4, wherein said stacked pairs of matched filters are substantially parallel to one another and substantially perpendicular to said stacked first and second manifolds.

6. The signal multiplexer of claim 5, wherein said third hybrid coupler is substantially parallel to said stacked pairs of matched filters.

7. The signal multiplexer of claim 6, wherein said signal combiner is a coax junction box.

8. The signal multiplexer of claim 7, wherein each of the filters of said first and second pairs of matched filters are wave guides that are spatially positioned in a stacked relationship and connected with said coax junction box;
    wherein said first and second hybrid couplers are wave guides that are positioned so as to abut and connect to separate ones of said first and second pairs of matched filters; and
    wherein said third hybrid coupler is a wave guide that is positioned to connect to said coax junction box.

9. The multiplexer of claim 4, wherein said notch filter is a wave guide.

10. The multiplexer of claim 1, wherein said signal combiner includes manifold structure, wherein said first and second bandpass filters are located adjacent opposed ends of said manifold structure, and wherein said notch filter is located intermediate said first and second bandpass filters.

11. The multiplexer of claim 10, wherein said notch filter includes a pair of notch filter structures, one of said notch filter structures being tuned to the carrier frequency of the aural signal and the other of said notch filter structures being tuned to a frequency that is in the range of about one to about 200 kilocycles above or below said aural carrier frequency.

* * * * *